3,296,163
POLY ALPHA OLEFINS STABILIZED WITH DITHIO-OXAMIDES AND PHENOLS
Piero Manaresi, Ferrara, and Vincenzo Giannella, Milan, Italy, assignors to Montecatini Edison S.p.A., Milan, Italy
No Drawing. Filed Dec. 4, 1961, Ser. No. 156,967
Claims priority, application Italy, Dec. 6, 1960, 21,038/60
13 Claims. (Cl. 260—23)

The present invention relates to the stabilization of alpha-olefins, more particularly, alpha-olefin polymers and copolymers obtained with various types of stereospecific catalysts, such polymers including high-density and low-density polyethylene.

More particularly, the invention relates to the use of a new class of organic sulfur compounds as stabilizers, said class consisting of compounds represented by the general formula

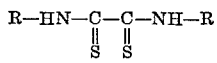

wherein R is selected from the group consisting of alkyl, cycloaliphatic, aryl, and alkyl-aryl radicals.

The invention furthermore relates to the unusually effective stabilizing action on polyolefins obtained by the synergistic effect of a combination of a sulfur compound of the aforementioned type with an ortho-hindered phenolic antioxidant.

It is known that polyethylene and polyalphaolefins undergo undesirable degradative and oxidizing actions, with objectionable alternations in their mechanical characteristics, appearance, odor, electric characteristics, etc. Such degradation and oxidation are caused by heat, air, oxygen and other oxidizing atmospheric agents. It has therefore been necessary to incorporate in the polymers small amounts of compounds having a stabilizing and antioxidizing action. Various classes of these compounds are known and include inhibitors peroxide decomposers, metal inactivators (sequestering agents), and radiation absorbers (e.g., for ultra violet rays).

The most widely used stabilizers of the inhibitor-type are ortho-hindered alkylphenols and aromatic amines. According to the most recent theories, these compounds act by blocking the propagation of free radical initiated chains, e.g., produced by dissociation of initially formed peroxides or by the action of light, with the formation of inactive products.

The stabilizers of the decomposer type are believed to act directly on the peroxides with a reaction which yields inert products (see Kennerly and Patterson, Ind. Eng. Chem. 48, 1917, (1956)).

The most generally known compounds of the decomposer type are organic sulfur compounds. These compounds are generally used in higher concentrations than the inhibitors in order to obtain the same stabilizing effect. However, in certain cases it is known that the combination of two antioxidants, one of the inhibitor-type, the other of the decomposer-type, exerts a much higher stabilizing activity as compared to the sum of the effects obtained from the single components, so that this can be considered as a true synergistic effect.

We have found a new class of stabilizing antioxidant compounds of the decomposer type, these compounds are defined by the formula

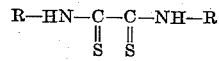

wherein R is selected from the group consisting of alkyl, cycloaliphatic, aryl, and alkyl-aryl radicals. These compounds are very effective in the stabilization of polyethylene and polyalphaolefins.

Typical examples of these compounds include N,N'-dimethyl-dithio - oxamide, N,N' - diethyl-dithio - oxamide, N,N'-dipropyl-dithio-oxamide, N,N' - diisobutyl - dithio-oxamide, N,N'-di-sec.butyl-dithio-oxamide, N,N'-dibutyl-dithio-oxamide, N,N'-diamyl - dithio - oxamide N,N'-di-hexyl-dithio-oxamide, N,N'-didodecyl - dithio - oxamide, N,N'- dicyclohexyl-dithio - oxamide and N,N' - dibenzyl-dithio-oxamide.

Their preparation is carried out by conventional methods described in the literature, e.g., O. Wallach, Ann. 262, 360 (1891). These products have recently been put on the market.

These compounds are added, either alone or in admixture with one another, in relatively small amounts, since their action is already manifest with a content of 0.02% based on the polymer to be stabilized. In general, from about 0.075 to 4% of decomposer compound based on the polymer are used. The compounding is carried out according to conventional methods known to those skilled in the art.

We have also found that, if desired, other secondary stabilizers may be added such as salts of organic acids (e.g., calcium or barium stearate and laurate), epoxy resins (e.g., those known under the trademark of Epikote, and the like), sequestering agents (ethylene-diamino-sodium tetra-acetate, etc.) radiation absorbers, etc., which secondary stabilizers do not decrease the stabilizing action of the decomposer compounds of the present invention but rather, actually increase their efficacy.

More particularly, we have found that by addition of inhibitor antioxidants, namely, ortho-hindered alkylphenols, a remarkable synergistic effect is obtained, with the stabilizing action being actually higher than the sum of the stabilizing activities of the single components. Included among the alkyl phenolic compounds of this type are 2,2'-methylene-bis(4-methyl-6-tert..butylphenol), 2,6-di-tert. butyl-4-methyl-phenol, 2,6-diisobornyl-4-methyl-phenol, 4,4'-thiobis-(6 tert.butyl-2-methyl-phenol), etc., and and also the commercial alkylphenolic antioxidants having various trademarks, such as Agerite Superlite, Nonox WSP, Nonox WSL, Dalpac 10, etc. These phenolic antioxidants are used in combination with the decomposer compounds of the present invention in amounts of from 0.05 to 1% of the polymer to be stabilized together with the previously specified amounts of the decomposer compounds of the present invention.

The following examples will further illustrate the invention. The parts therein specified are by weight unless otherwise stated.

*Example 1*

In a sample of powdered polypropylene obtained by the processes which are described in United States patent application Serial No. 550,164, filed on Nov. 30, 1955, now abandoned, the stabilizer amounts shown in the following Table 1 dissolved or suspended in acetone are dispersed mechanically.

After evaporation of acetone the mix is extruded at 200–220° C., thereby obtaining granules of uniform size which are used for die-casting of specimens in the form of plates 1 mm. thick. From these plates, rectangular specimens of about 10 x 100 mm. are prepared which are introduced into the following accelerated aging testers:
(a) Air oven at 120° C.,
(b) Air oven at 160° C.,
(c) Atlas Weatherometer (2-arcs lamps, average temperature 50° C., relative humidity about 45%).

The effect of aging is periodically evaluated by withdrawing the specimens and subjecting them to simple bending in order to reveal their brittleness, if any.

In order to evaluate the stabilization against degradation during processing, the Melt Index values (ASMT D1238–57T) are also reported as determined first on the polymer granulated by extrusion at 220° C., and then on plates molded at 280° C. for 10 minutes from the same granulate. The Melt Index is however determined with an applied load of 10 kg. instead of the usual load of 2.16 kg.

TABLE 1

|  | Parts | Parts | Parts | Parts |
|---|---|---|---|---|
| Polypropylene | 100 | 100 | 100 | 100 |
| Agerite Superlite |  | 0.2 |  | 0.3 |
| Calcium stearate |  | 0.2 | 0.2 | 0.2 |
| N,N'-didodecyl-dithio-oxamide |  |  | 0.2 | 0.4 |
| Aging Resistance (brittle test) | Days | Days | Days | Days |
| In Weatherometer | 2 | 7 | 7 | 9 |
| In an oven at 120° C | 1 | 45 | 60 | 100 |
| In an oven at 160° C | 10 | 2 | 1 | 15 |
| Melt Index on the product granulated at 220° C | 40 | 3.1 | 4.8 | 3.9 |
| Melt Index on plates molded at 280° C | 100 | 12.5 | 11.6 | 6.9 |

*Example 2*

From a second sample of powdered polypropylene, and by operating according to the procedure described in Example 1, specimens with a composition corresponding to those reported in Table 2 were prepared. The results of the aging tests and the working tests are also reported.

The aging effect is periodically evaluated by withdrawing the specimens and subjecting them to bending in order to determine their brittleness, if any.

TABLE 3

|  | Parts | Parts | Parts | Parts |
|---|---|---|---|---|
| Polyethylene | 100 | 100 | 100 | 100 |
| Agerite superlite |  | 0.2 |  | 0.2 |
| Calcium stearate |  | 0.2 | 0.2 | 0.2 |
| N,N'-didodecyl-dithio-oxamide |  |  | 0.2 | 0.2 |
| Resistance to aging (brittleness test) | Days | Days | Days | Days |
| In Weatherometer | 8 | 10 | 10 | 15 |
| In an oven at 100° C | 5 | 15 | 20 | 100 |

*Example 4*

In a sample of powdered polybutene-1, obtained with the aid of a stereospecific catalytic system and having the following characteristics: residue from ether extraction, 95%; intrinsic viscosity (determined in tetrahydronaphthalene at 135° C.), 2.5; the antioxidant amounts reported in the following Table 4 are dispersed mechanically.

By operating with the modalities described in the preceding example but carrying out the extrusion and molding at a temperature of 180° C., specimens having the composition reported in the following Table 4 (which shows also the results of the aging tests) were prepared.

TABLE 2

|  | Parts | Parts | Parts | Parts | Parts |
|---|---|---|---|---|---|
| Polypropylene | 100 | 100 | 100 | 100 | 100 |
| 2,6'-di-tert. butylmethylphenol |  | 0.2 | 0.2 | 0.2 | 0.2 |
| Calcium stearate |  | 0.2 | 0.2 | 0.2 | 0.2 |
| N,N'-didodecyl-dithio-oxamide |  |  | 0.2 |  |  |
| N,N'-dibenzyl-dithio-oxamide |  |  |  | 0.2 |  |
| N,N'-dicyclohexyl-dithio-oxamide |  |  |  |  | 0.2 |
| Aging Resistance (brittle test) | Days | Days | Days | Days | Days |
| In Weatherometer | 2 | 8 | 8 | 9 | 8 |
| In an oven at 120° C | 1 | 3 | 38 | 35 | 18 |
| In an oven at 160° C | 10 | 12 | 12 | 12 | 12 |
| Melt Index of the product extruded at 220° C | 30 | 2.4 | 1.3 | 1.4 | 1.7 |
| Melt Index of plates molded at 280° C | 70 | 3.0 | 4.3 | 5.4 | 3.7 |

*Example 3*

In a sample of powdered polyethylene obtained by the low pressure process and having the following characteristics: Density=0.940, molecular weight=80,000, the antioxidant amounts shown in Table 3 are dispersed mechanically with the usual modalities.

The mix is then extruded at 200° C. into granules of uniform size which are used for the compression-molding of specimens in the form of laminae having a thickness of 1 mm.

These laminae are cut into rectangular specimens, having a size of 10 x 100 mm., which are introduced into the following accelerated aging testers:

(a) An oven at 100° C.,
(b) Atlas Weatherometer (2-arc lamp, average temperature: 50° C., relative humidity: about 45%).

TABLE 4

|  | Parts | Parts | Parts | Parts |
|---|---|---|---|---|
| Polybutene-1 | 100 | 100 | 100 | 100 |
| Agerite Superlite |  | 0.2 |  | 0.2 |
| Calcium stearate |  | 0.2 | 0.2 | 0.2 |
| N,N'-didodecyl-dithio-oxamide |  |  | 0.2 | 0.2 |
| Resistance to aging (brittleness test) | Days | Days | Days | Days |
| In Weatherometer | 7 | 10 | 9 | 15 |
| In an oven at 110° C | 3 | 20 | 25 | 100 |

*Example 5*

An ethylene-propylene copolymer having an ethylene molar content of 50% and a molecular weight of 140,000, obtained by copolymerization at −10° C. with a catalytic system on the basis of VCl₄ and triisobutyl aluminum, was mixed in a roll mixer with 0.2% of N,N'-didodecyl-dithio-oxamide and the mix was reduced into 3-mm. thick sheets.

Analogous sheets were prepared with the some copolymer free of stabilizer.

The specimens were stored for the whole summer at room temperature (25–35° C.) under diffused light.

After 100 days the Mooney viscosity (ML1+4, 100° C.) of the non-stabilized sample were reduced from 41.5 to 19 while that of the sample containing the stabilizer was practically unaltered.

Variations can of course be made without departing from the spirit of our invention.

Having thus described our invention, what we desire to secure and hereby claim by Letters Patent is:

1. A stabilized polymeric composition comprising a solid polymer of an alpha-mono-olefin, a stabilizer having the general formula

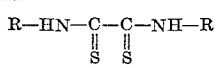

wherein R is selected from the group consisting of alkyl, cycloalkyl unsubstituted aryl and alkyl-aryl radicals, said stabilizer being present in proportions of from about 0.075 to 4% by weight based on the weight of said solid polymer, and an alkylphenol antioxidant in proportions of from about 0.05 to 1% by weight of said solid polymer.

2. The stabilized polymeric composition of claim 1 wherein the polymer of an alpha-mono-olefin is selected from the group consisting of polyethylene, polypropylene, and polybutene-1.

3. The composition of claim 2 wherein said polymer of an alpha-mono-olefin is high density polyethylene.

4. The composition of claim 2 wherein said polymer of an alpha-mono-olefin is low density polyethylene.

5. The stabilized polymeric composition of claim 1 wherein the polymer of an alpha-mono-olefin is a copolymer of ethylene and propylene.

6. The stabilized polymeric composition of claim 1 wherein the polymer of an alpha-mono-olefin is a copolymer of ethylene and butene-1.

7. The stabilized polymeric composition of claim 1 wherein the stabilizer is N,N'-didodecyl-dithio-oxamide.

8. The stabilized polymeric composition of claim 1 wherein the stabilizer is N,N'-dibenzyl-dithio-oxamide.

9. The stabilized polymeric composition of claim 1 wherein the stabilizer is N,N'-dicyclohexyl-dithio-oxamide.

10. The product of claim 1 in filamentary form.
11. The product of claim 1 in fiber form.
12. The product in claim 1 in film form.
13. The composition of claim 1, said composition also containing a secondary stabilizer selected from the group consisting of calcium stearate, calcium laurate, barium stearate, barium laurate, and ethylene-diamino-sodium tetra acetate.

References Cited by the Examiner

UNITED STATES PATENTS

| | | | |
|---|---|---|---|
| 2,484,257 | 10/1949 | Watson et al. | 260—45.9 |
| 2,938,879 | 5/1960 | Mack et al. | 260—45.9 |
| 2,985,617 | 5/1961 | Salyer et al. | 260—45.9 |

LEON J. BERCOVITZ, *Primary Examiner.*

ALPHONSO D. SULLIVAN, DONALD E. CZAJA,
*Examiners.*

H. E. TAYLOR, *Assistant Examiner.*